(12) United States Patent
Henry et al.

(10) Patent No.: US 9,499,330 B2
(45) Date of Patent: Nov. 22, 2016

(54) PRESSURE RELIEF DEVICE FOR PRESSURIZED CONTAINER

(71) Applicant: ILLINOIS TOOL WORKS INC., Glenview, IL (US)

(72) Inventors: Richard A. Henry, Decatur, AL (US); Mark A. Ferreira, Decatur, AL (US); Yurij F. Wowczuk, Pittsburgh, PA (US)

(73) Assignee: ILLINOIS TOOL WORKS INC, Glenview, IL (US)

( * ) Notice: Subject to any disclaimer, the term of this patent is extended or adjusted under 35 U.S.C. 154(b) by 4 days.

(21) Appl. No.: 14/408,987

(22) PCT Filed: Jun. 23, 2013

(86) PCT No.: PCT/US2013/047213
§ 371 (c)(1),
(2) Date: Dec. 18, 2014

(87) PCT Pub. No.: WO2014/008014
PCT Pub. Date: Jan. 9, 2014

(65) Prior Publication Data
US 2015/0151900 A1 Jun. 4, 2015

Related U.S. Application Data

(60) Provisional application No. 61/663,924, filed on Jun. 25, 2012.

(51) Int. Cl.
*B65D 6/40* (2006.01)
*B65D 83/70* (2006.01)
*F16K 17/16* (2006.01)

(52) U.S. Cl.
CPC ............... *B65D 83/70* (2013.01); *F16K 17/16* (2013.01)

(58) Field of Classification Search
CPC .............. B65D 83/70; B65D 51/1638; Y10T 137/1744; Y10T 137/1714; Y10T 137/1752; F17C 2203/069
USPC ................... 220/745; 222/396, 397
See application file for complete search history.

(56) References Cited

U.S. PATENT DOCUMENTS 3,292,826 A * 12/1966 Abplanalp ............. B65D 83/70
                                                           220/268
3,724,727 A *  4/1973 Zundel ................... B65D 83/70
                                                           222/397

(Continued)

FOREIGN PATENT DOCUMENTS

DE      2336889 A1    4/1974
EP      1785371 A1    5/2007

(Continued)

OTHER PUBLICATIONS

ISR and WO for PCT/US2013/047213 mailed Oct. 29, 2013.

*Primary Examiner* — Shawn M Braden
(74) *Attorney, Agent, or Firm* — Paul F. Donovan

(57) ABSTRACT

A pressure relief device for venting an internally pressurized container and an aerosol can having a can bottom containing this pressure relief device. The pressure release device includes a coined pressure vent within a domed can bottom. The pressure vent is characterized by a venting pressure greater than about 500 psig. In addition, the can bottom resists eversion and/or failure along the mechanical attachment to the container body at all pressures between the venting pressure and the longitudinal rupture pressure in the container body.

20 Claims, 4 Drawing Sheets

(56) References Cited

U.S. PATENT DOCUMENTS

| | | | | |
|---|---|---|---|---|
| 3,850,339 A * | 11/1974 | Kinkel | ............... | B65D 83/70 220/203.09 |
| 4,003,505 A * | 1/1977 | Hardt | ............... | B65D 83/70 222/397 |
| 4,513,874 A | 4/1985 | Mulawski | | |
| 7,222,757 B2 * | 5/2007 | Ferreira | ............... | B65D 83/70 137/68.27 |
| 7,875,376 B2 * | 1/2011 | Stearns | ............... | H01M 2/0235 220/203.01 |
| 8,636,169 B2 * | 1/2014 | Sampaio | ............... | B65D 25/2891 200/555 |
| 2009/0223956 A1 | 9/2009 | Matsukawa et al. | | |
| 2013/0020320 A1 | 1/2013 | Ferreira et al. | | |

FOREIGN PATENT DOCUMENTS

| | | | | |
|---|---|---|---|---|
| KR | 101049923 B1 | 7/2011 | | |
| WO | 2011153405 A2 | 12/2011 | | |
| WO | WO 2011153405 A2 * | 12/2011 | ............. | B65D 83/38 |

\* cited by examiner

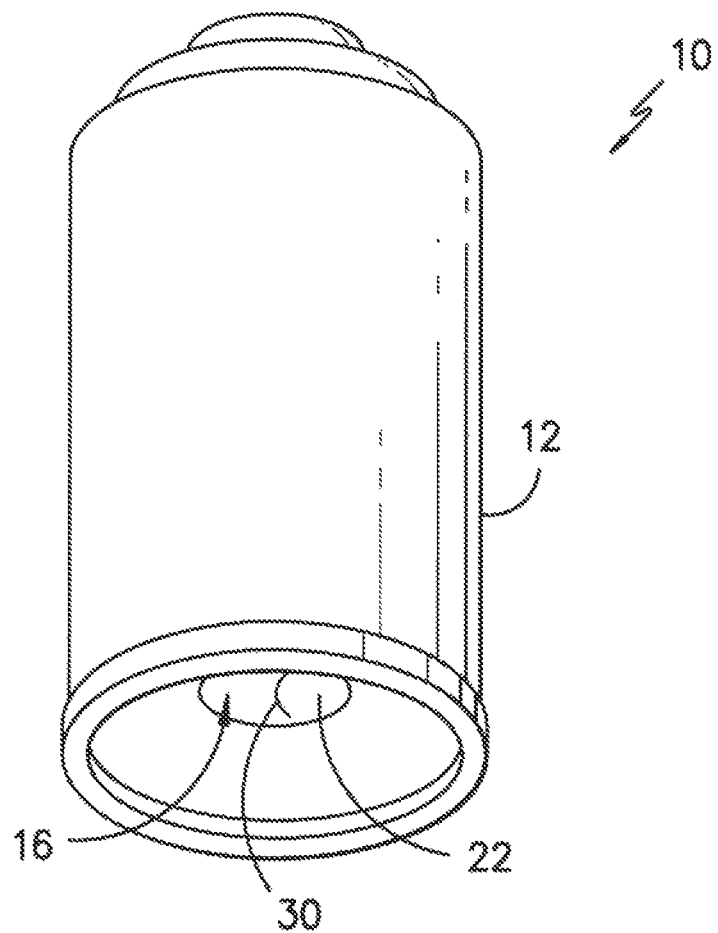
FIG. -1-

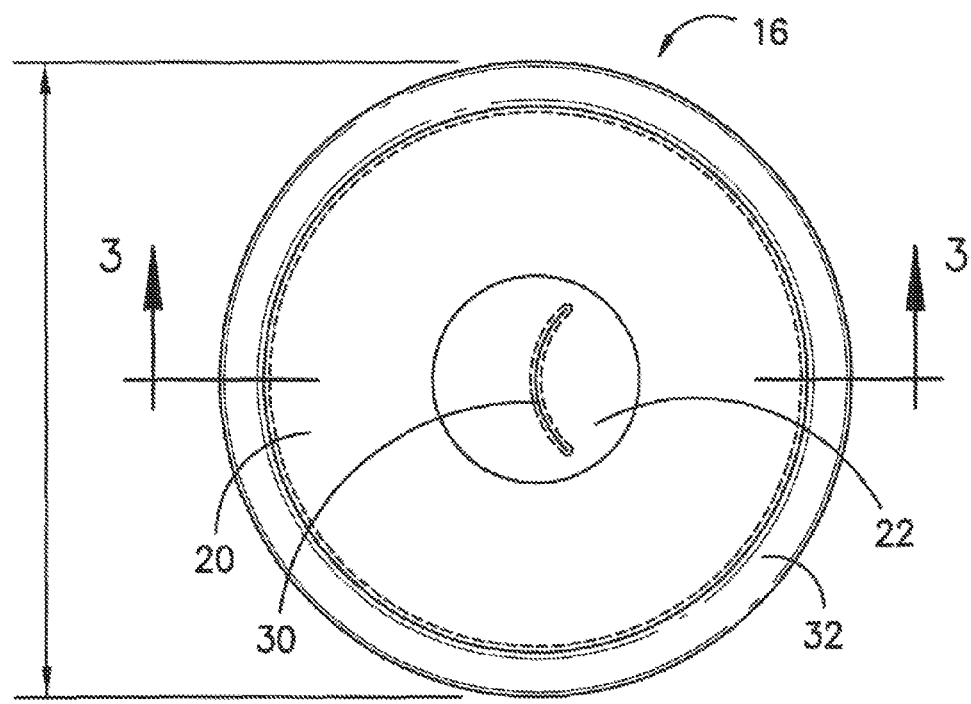
FIG. -2-
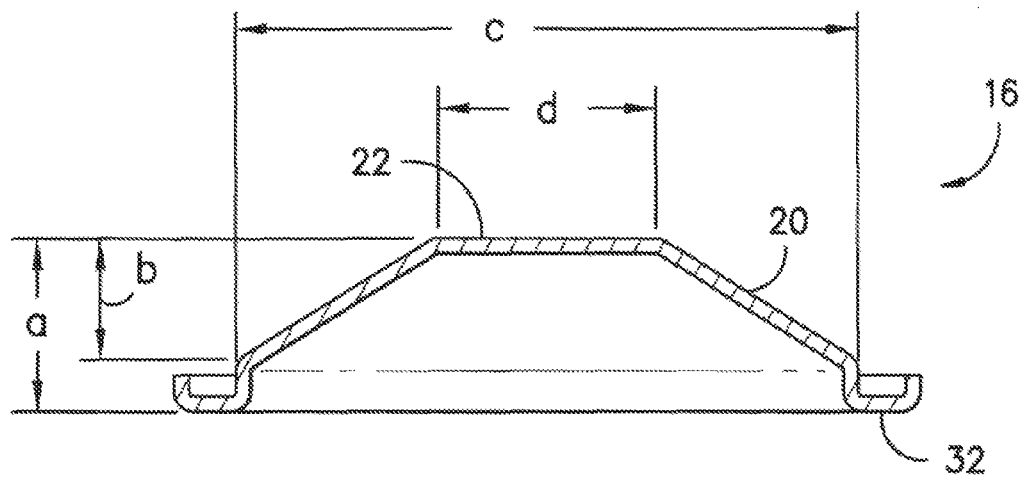
FIG. -3-

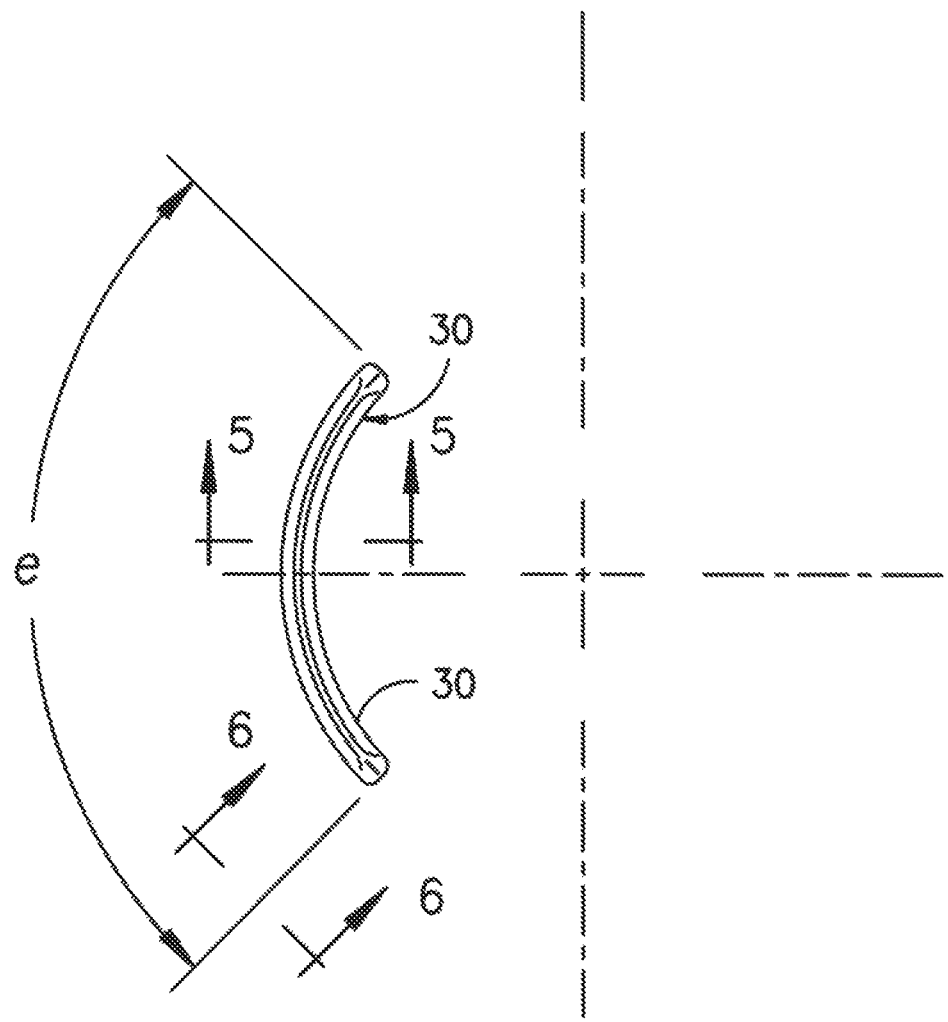
FIG. -4-

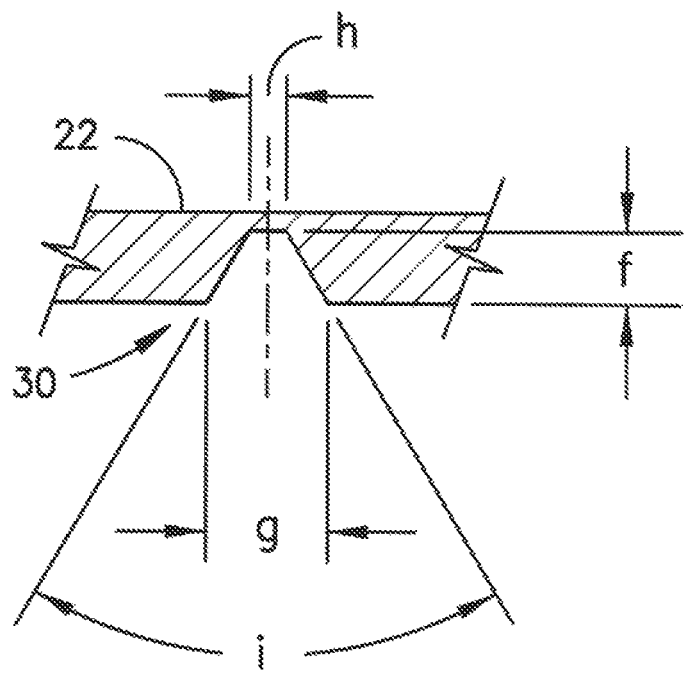
FIG. -5-
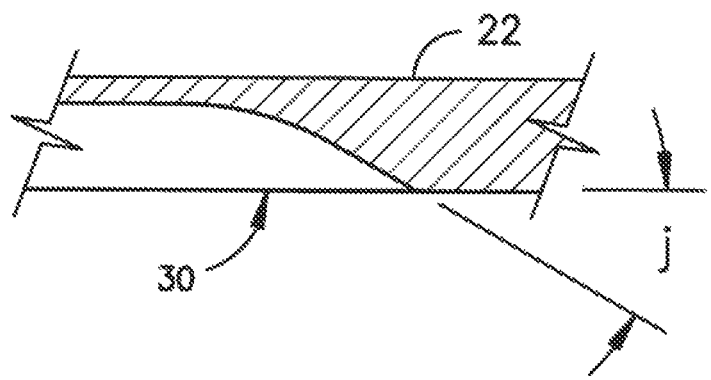
FIG. -6-

PRESSURE RELIEF DEVICE FOR PRESSURIZED CONTAINER

CROSS-REFERENCE TO RELATED APPLICATIONS

This application is a National Phase of International Application Number PCT/US2013/047213 filed Jun. 23, 2013 and claims the benefit of, and priority from U.S. provisional application 61/663,924 filed on Jun. 25, 2012 the contents of which are hereby incorporated by reference in their entirety.

TECHNICAL FIELD

This disclosure relates to pressure release devices for internally pressurized fluid containers and aerosol cans having such pressure relief devices.

BACKGROUND OF THE INVENTION

Pressurized fluid containers are in widespread use for packaging and dispensing a variety of fluid products, including liquids, gases, solids and combinations thereof. Under normal operating conditions such containers perform entirely satisfactorily. However, in the event that the contents of such containers become over-pressurized, either because of improper use, exposure to heat or for any other reason, then a violent rupture may occur. The art has provided a variety of pressure relief devices for aerosol cans to prevent explosion of the pressurized can by controlled pressure release prior to catastrophic failure. Many of these pressure relief devices are in the bottom of the can, while some are in the body sidewall or top.

By way of example only, one category of pressure relief devices provides one or more concave regions in the bottom of the can in combination with coined lines of reduced material thickness. In this regard, it is to be understood that the term "coin" or "coining" denotes a process of removing or displacing metal to achieve a desired indentation profile with an underling web at the base of the indentation. Coining includes scoring and/or applied pressure techniques as will be well known to those of skill in the art. In operation, the bottom fractures along the coined lines in response to an over pressurization of the container contents thereby creating vent openings. A controlled and predictable release of pressure is thus provided.

One known system for controlled pressure release is provided in U.S. Pat. No. 4,513,874 to Mulawski. Another system which has been found to be highly effective is disclosed in U.S. Pat. No. 7,222,757 to Ferreira et al. Yet another system which is highly effective is disclosed in U.S. published patent application 2013/0020320 to Ferreira et al. The contents of all references identified herein are hereby incorporated by reference as if fully set forth in their entirety.

Typically, in past devices the coined line in the bottom has experienced fracture and corresponding controlled pressure relief at internal pressures of about 380 psig to about 450 psig. However, in some instances venting at the desired pressure may not occur as intended. By way of example only, and not limitation, factors which may prevent fracture and venting at the intended pressure may include the introduction of a coin depth which is too shallow due to tooling variations and/or variations in the starting material thickness of the material forming the can bottom such that the web of material remaining at the base of the coined line after introduction is slightly thicker than intended.

In many prior venting systems using coined bottoms, there has been a reversal of the can bottom in the event that the vent does not activate at the intended pressure. That is, in the event that venting by bottom fracture does not take place at the prescribed pressure level as intended, the pressure eventually may be relieved by a reversal failure at the bottom such that the concave dome of the bottom undergoes eversion wherein the bottom reverses upon itself to develop a bulging convex profile and eventually fails by bursting or separating from the body to permit escape of the pressurized contents.

It is generally desirable for the normal venting pressure to be relatively high to avoid premature venting at pressures experienced due to variations in environmental conditions during storage and/or use. At the same time, it may be desirable for the can bottom to have an eversion pressure resulting in reversal failure which is significantly greater than the intended venting pressure. However, in the past, it has been difficult to achieve ultimate strength levels in a coined container bottom that allow the container bottom to withstand pressures significantly above about 500 psig before reversal failure will take place. Thus, the designed venting pressure has typically been below about 500 psig to account for variability due to material thicknesses and the like. However, the designed venting pressure may not be set too low or unintended premature venting may take place.

Consequently, there is a continuing need for a pressure relief device having a coined pressure vent characterized by a normal venting pressure of greater than 500 psig before venting and a suitable eversion pressure to avoid reversal failure.

SUMMARY OF THE INVENTION

The present disclosure provides advantages and alternatives over the prior art by providing a pressure relief device for venting an internally pressurized container and an aerosol can having a can bottom containing this pressure relief device. The pressure release device includes a coined pressure vent within a domed can bottom. The pressure vent is characterized by a venting pressure greater than about 500 psig. In addition, the can bottom resists eversion and/or failure along the mechanical attachment to the container body at all pressures between the venting pressure and the longitudinal rupture pressure in the container body. Accordingly, in the absence of venting through the pressure release device, pressure is released by longitudinal rupture in the body of the container without eversion and/or failure along the mechanical attachment.

According to one exemplary aspect, the present disclosure provides a pressure relief device of domed construction adapted to vent contents of an internally pressurized container upon development of a pre-defined pressure in excess of 500 psig within the container. The pressure relief device includes a sloped annular sidewall intersecting a circular central plateau to define a flat top to the domed container bottom. The circular central plateau has a center point disposed at the center of the pressure relief device and an arc-shaped coin line extending about an arc with the apex of the arc positioned at the center point of the circular central plateau. The arc-shaped coin line has a depth providing a remaining opposing web of material with a thickness of not less than 0.005 inches. The ratio of the plateau diameter to the elevation of the sloped annular sidewall is in the range of about in the range of about 1.3 to about 2.2. The pressure relief device is characterized by a venting pressure in excess of about 500 psig, a body rupture pressure of at least 700 psig and bottom eversion pressure in excess of the body rupture pressure.

Other objects and advantages of the pressure relief device and aerosol can will become apparent from a description of certain preferred embodiments thereof which are shown in the drawings.

BRIEF DESCRIPTION OF THE DRAWINGS

FIG. 1 is a schematic bottom perspective view of an exemplary aerosol container including a concave domed bottom with a pressure release device consistent the present disclosure;

FIG. 2 is a schematic plan view of an exemplary can bottom consistent the present disclosure FIG. 3 is a schematic sectional view taken along line 3-3 in FIG. 2 with the vent closed;

FIG. 4 is a schematic view illustrating an exemplary arc-shaped coin line in the can bottom;

FIG. 5 is a schematic cross-section view taken generally along line 5-5 in FIG. 4 transverse to the coin line in the can bottom; and FIG. 6 is a sectional view taken generally along line 6-6 in FIG. 4.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF PREFERRED EMBODIMENTS

Referring now to the drawings, a container 10 such as an aerosol can of the type conventionally employed to package and dispense pressurized fluid products such as spray paint and the like is shown in FIG. 1. The container has a cylindrical body 12 and a domed bottom defining a pressure relief device 16 adapted to vent contents of the container 10 in the event that pressure increases beyond a pre-defined level of not less than 500 psig. The pressure relief device 16 can be used on any type of pressurized can known in the art.

By way of example only and not limitation, exemplary embodiment of a pressure relief device 16 consistent with the present disclosure is illustrated in FIGS. 2-6. The pressure relief device 16 is preferably of unitary construction formed from a single piece of steel or other deformable metal. In one exemplary practice, the device may be stamped from a substantially round blank with a thickness of about 0.030 inches and a diameter of about 3.730 inches. In another exemplary practice, the device may be stamped from a substantially round blank with a thickness of about 0.030 inches and diameter of about 3.375 inches. Of course, other thicknesses and dimensions consistent with the concepts of this disclosure may be used if desired.

As seen through joint reference to FIGS. 1 and 3, the stamped can bottom may have an annular sloped sidewall segment 20 surrounding a substantially circular flat center plateau 22. The annular sloped sidewall segment 20 and the center plateau 22 are formed from the same material and may have substantially the same thickness. As shown, the annular sloped sidewall segment 20 may have a substantially uniform pitch along its length such that the slope does not change significantly along the length. However, the sloped sidewall segment may likewise have portions of different pitch if desired. As best seen in FIGS. 2 and 4, an arc-shaped coin line 30 is disposed across the surface of the center plateau 22 such that the apex of the arc is substantially at the center of the plateau and at the center of the can bottom. Thus, the center plateau 22 is concentric relative to the overall circumference of the can bottom and the apex of the coin line 30 is centered relative to the center plateau. Accordingly, the central axis of symmetry of the pressure relief device 16 preferably intersects and passes through the arc shaped coined line 30 at its apex.

In the exemplary construction, the dome height of the can bottom in the present disclosure has been increased relative to prior known can bottoms for the same diameter can. In addition, the center plateau 22 of the present disclosure has a smaller diameter than prior center plateaus for the same diameter can. By way of example only, and not limitation, in accordance with one exemplary embodiment, the domed bottom may have an overall height "a" of about 0.68 inches and the sloped sidewall segment 20 may have an elevation "b" of about 0.48 inches with a dome diameter "c" of about 2.58 inches and a plateau diameter "d" of about 0.88 inches.

It is has been found that for a given material thickness, the ratio of the plateau diameter "d" to the sidewall segment elevation "b" (that is, d/b) is preferably less than about 2.2 and more preferably is in the range of about 1.3 to about 2.2 and still more preferably is in the range of about 1.6 to about 2.0 and still more preferably is about 1.8. Maintaining such ratios promoting deep dome elevation and reduced flat plateau diameter has been found to promote greatly improve the resistance to bottom eversion and failure.

Referring now to FIGS. 4-6, in the exemplary embodiment the coin line profile is preferably defined by an arc angle "e" of about 85 degrees to about 95 degrees, and will most preferably be about 90 degrees. However, larger or smaller arc angles may be used if desired. The coin line 30 is preferably formed to provide a remaining web thickness greater than has been used in prior vent constructions for similar cans. The coin line is preferably formed to provide a remaining web thickness opposing the coined line of greater than about 0.005 inches and more preferably at least about 0.006 inches or greater. In one exemplary embodiment in which the pressure relief device is formed from a unitary piece of electrolytic tin coated, sheet steel with a thickness of about 0.030 inches, the coin line 30 may have a depth "f" of about 0.024 inches (FIG. 5) thereby resulting in an opposing web thickness of about 0.006 inches. Of course, other thickness dimensions may be used if desired.

As best seen in FIG. 5, the coined line 30 may have a substantially trapezoidal cross section profile. In one exemplary embodiment in which the pressure relief device 16 is formed from a unitary piece of electrolytic tin coated, sheet steel with a thickness of about 0.030 inches, the coin line 30 may have a width "g" of about 0.039 inches at the exterior and a width "h" of about 0.011 inches at the interior, although other width dimensions may be used if desired. According to one potentially preferred embodiment, the angled sides in the coined line 28 may cooperatively form an angle 'i" of about 60 degrees with each side having about a 30 degree taper. As seen in FIG. 6, at each end of the coin line 30, the depth is reduced gradually along a taper having an angle "j" of about 30 degrees relative to the surface.

As noted previously, a pressure relief device 16 in accordance with the present disclosure may operate to vent at pressures significantly in excess of 500 psig. In particular, a pressure relief with characteristics as illustrated and described herein has been found to vent consistently at about 700 psig+/−20 psig. Moreover, in the absence of venting, the container will exhibit failure by longitudinal body rupture at pressures of about 800 psig or above without the occurrence of bottom eversion or mechanical joint failure.

As noted previously the dome height and dimensions of the center plateau 22 may be correlated according to define ratios to provide high reversal pressures exceeding the longitudinal body rupture pressure of the container. Nonetheless, by virtue of the overall configuration, venting does not commence until significant pressure in excess of about 500 psig or more is developed. In this regard, in utilizing the illustrated and described construction it has been found that during normal operation when the container is over pressurized at about 700 psig, the bottom will open along the coined line 30 thereby allowing the container to vent. In the event that venting fails to take place, the pressure may build to a level in excess of about 800 psig and the container will thereafter fail by longitudinal rupture of the body 12. The failure by longitudinal rupture takes place at a pressure level of at least 50 psig above the intended venting pressure at the coin line and more preferably about 100 psig or greater above the intended venting pressure. Importantly, this longitudinal body rupture occurs prior to eversion failure in the bottom. Thus, the container bottom may readily withstand about 500 psig or greater without bursting even if venting does not take place. The substantial differential between designed venting pressure and the failure pressure corresponding to longitudinal rupture with no bottom eversion reduces the influence of any variation in the manufacturing process which may cause the actual venting pressure to deviate from the intended level. Thus, even a very substantial inconsistency in the actual venting pressure will not result in bursting failure.

The design relationships consistent with the present disclosure are applicable across a wide range of standard can diameters. Burst strength may be confirmed by iterative testing in which a container incorporating the desired ratio of plateau diameter to dome height is pressurized without the presence of a coined line. Upon confirming that bursting takes place without bottom eversion at a pressure exceeding about 800 psig or greater, an arc-shaped coined line 30 as previously described is introduced with the centerline apex of the arc substantially at the center of the flat center plateau 22 and concentric with the central axis of the container. The depth of the coined line is set such that venting will normally take place at a pressure level of 500 psig or greater (preferably about 700 psig). This depth may be calculated or determined by iterative testing.

It has been found that a pressure relief device 16 designed according to the above procedure may then be readily reproduced and will be prone to venting pressure release at high pressure levels exceeding 500 psig, but nonetheless well in advance of any bursting failure. Moreover, even if variations in manufacturing cause the actual venting pressure to be much higher than expected, venting will nonetheless take place prior to bursting failure due to the high burst strength levels.

All dimensions set forth herein are merely exemplary and are in no way limiting to the present disclosure. Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments and equivalents to the extent permitted by the prior art.

The invention claimed is:

1. A pressure relief device of domed construction adapted to vent contents of an internally pressurized container having a cylindrical body upon development of a pre-defined pressure in excess of 500 psig within the container, the pressure relief device comprising: a sloped annular sidewall intersecting a circular central plateau to define a flat top to a concave container bottom, the circular central plateau having a center point disposed at the center of the pressure relief device and an arc shaped coin line extending out an arc with the apex of the arc positioned at the center point of the circular central plateau and wherein the arc shaped coin line has a depth providing a remaining opposing web of material with a thickness of not less than about 0.005 inches, the arc shaped coin line being adapted to fracture and vent the contents of the container at the predefined pressure, wherein the ratio of the plateau diameter to the elevation of the sloped annular sidewall is in the range of about 1.3 to about 2.2 and wherein the pressure relief device is characterized by a venting pressure in excess of about 500 psig, wherein the cylindrical body has a body rupture pressure of at least 700 psig and wherein the container bottom has a bottom eversion pressure in excess of the body rupture pressure such that body rupture occurs at a lower pressure than bottom eversion.

2. The pressure relief device as recited in claim 1, wherein the pressure relief device is, of unitary construction formed from a single piece of sheet steel.

3. The pressure relief device as recited in claim 2, wherein the sloped annular sidewall and the central plateau have a common thickness.

4. The pressure relief device as recited in claim 3, wherein the common thickness is about 0.029 inches or greater.

5. The pressure relief device as recited in claim 1, wherein the ratio of the plateau diameter to the elevation of the sloped annular sides all is in the range of about 1.6 to about 2.0.

6. The pressure relief device as recited in claim 5, wherein the ratio of the plateau diameter to the elevation of the sloped annular sidewall is at least 1.8.

7. The pressure relief device as recited in claim 5, wherein the arc-shaped coin line has a depth providing a remaining opposing web of material with a thickness of not less than about 0.006 inches.

8. The pressure relief device as recited in claim 1, wherein the arc shaped coin line is trapezoidal in transverse cross section with a depth providing a remaining opposing web of material with a thickness of not less than 0.005 inches.

9. The pressure relief device as recited in claim 1, wherein the arc shaped coin line, is trapezoidal in transverse cross section and, extends through an angle of about 85 degrees to about 95 degrees.

10. The pressure relief device as recited in claim 1, wherein the arc shaped coin line is trapezoidal in transverse cross section with a depth providing a remaining opposing web of material with a thickness of not less than about 0.006 inches and extends through an angle of about 88 degrees to 92 degrees.

11. The pressure relief device as recited in claim 1, wherein the arc shaped coin line is trapezoidal in transverse cross section with a depth providing a remaining opposing web of material with a thickness of not less than about 0.006 inches and extends through an angle of about 90 degrees.

12. A pressure relief device of domed construction adapted to vent contents of an internally pressurized container having a cylindrical body upon development of a pre-defined pressure in excess of 500 psig within the container, the pressure relief device comprising: a sloped annular sidewall having a substantially uniform pitch and intersecting a circular central plateau to define a flat top to a concave container bottom, the circular central plateau having a center point disposed at the center of the pressure relief device and an arc shaped coin line extending about an arc with the apex of the arc positioned at the center point of the circular central plateau and wherein the arc shaped coin line has a depth providing a remaining opposing web of material with a thickness of not less than 0.005 inches, the arc shaped coin line being adapted to fracture and vent the contents of the container at the predefined pressure, wherein the ratio of the plateau diameter to the elevation of the sloped annular sidewall is in the range of about in the range of about 1.3 to about 2.2 and wherein the pressure relief device is characterized by a venting pressure in excess of about 500 psig, wherein the cylindrical body has a body rupture pressure of at least 800 psig and wherein the container bottom has a bottom eversion pressure in excess of the body rupture pressure, such that body rupture occurs at a lower pressure than bottom eversion and wherein, the body rupture pressure is at least 50 psig greater than the venting pressure.

13. The pressure relief device as recited in claim 12, wherein the pressure relief device is of unitary metal construction formed from a single piece of sheet steel and wherein the sloped annular sidewall and the central plateau have a common thickness.

14. The pressure relief device as recited in claim 13, wherein the common thickness is about 0.029 inches or greater.

15. The pressure relief device as recited in claim 12, wherein the ratio of the plateau diameter to the elevation of the sloped annular sidewall is in the range of about 1.6 to about 2.0.

16. The pressure relief device as recited in claim 15, wherein the ratio of the plateau diameter to the elevation of the sloped annular sidewall is about 1.8.

17. The pressure relief device as recited in claim 15, wherein the arc shaped coin line has a depth, providing a remaining opposing web of material with a thickness of not less than 0.006 inches.

18. The pressure relief device as recited in claim 12, wherein the arc shaped coin line is trapezoidal in transverse cross section with a depth providing a remaining opposing web of material with a thickness of not less than about 0.006 inches and extends through an angle of about 88 degrees to 92 degrees.

19. The pressure relief device as recited in claim 12, wherein the arc shaped coin line is trapezoidal in transverse cross section with a depth providing a remaining opposing web of material with a thickness of not less than about 0.006 inches and extends through an angle of about 90 degrees.

20. An aerosol can having a top, a concave domed bottom and a cylindrical body extending between the top and the bottom, the can bottom defining a pressure relief device of domed construction adapted to vent contents of the can upon development of a pre-defined pressure in excess of 500 psig within the can, the pressure relief device comprising: a sloped annular sidewall having a substantially uniform pitch intersecting a circular central plateau to define a flat top to the concave domed bottom, the circular central plateau having a center point disposed at the center of the pressure relief device and an arc shaped coin line extending about an arc with the apex of the arc positioned at the center point of the circular central plateau and wherein the arc shaped coin line has a depth providing a remaining opposing web of material with a thickness of not less than about 0.005 inches, the arc shaped coin line being adapted to fracture and vent the contents of the container at the predefined pressure, wherein the ratio of the plateau diameter to the elevation of the sloped annular sidewall is in the range of about in the range of about 1.3 to about 2.2 and wherein the pressure relief device is characterized by a venting pressure in excess of about 500 psig, wherein the cylindrical body has a body rupture pressure of at least 800 psig and wherein the can bottom has a bottom eversion pressure in excess of the body rupture pressure such that body rupture occurs at a lower pressure than bottom eversion.

* * * * *